Oct. 6, 1970   R. J. KULPERGER ET AL   3,531,916
GAS DEHYDRATION

Filed May 15, 1968   2 Sheets-Sheet 2

INVENTOR.
ROBERT J. KULPERGER
ROBERT CUNNINGHAM
BY William G. Hofley

United States Patent Office 3,531,916
Patented Oct. 6, 1970

3,531,916
GAS DEHYDRATION
Robert J. Kulperger, Weston, Ontario, and Robert Cunningham, Calgary, Alberta, Canada, assignors to Union Carbide Canada Limited, Toronto, Ontario, Canada, a corporation of Canada
Filed May 15, 1968, Ser. No. 729,242
Int. Cl. B01d 53/04
U.S. Cl. 55—33
4 Claims

ABSTRACT OF THE DISCLOSURE

A process and apparatus for reducing the moisture level of natural gas in a continuous system using a pair of desiccant beds one of which is dry. A wet gas stream is divided into major and minor streams. The major stream is passed through a first bed of desiccant which is substantially dry and is thereby effectively dehydrated. The minor stream is heated and passed through a second bed of moisture laden desiccant so that the bed is effectively purged of water. The minor stream is then cooled to remove free water and combined with the dehydrated major stream to yield a quantity of natural gas having a moisture content within acceptable limits for pipeline delivery. The process is continued by alternating the direction of further major and minor streams so that the further major stream goes to the second bed which is now effectively dehydrated and the minor stream goes to the first bed which is moisture laden from the previous stage.

---

This invention relates to a method and apparatus for reducing the water content of a moisture laden gas. More particularly, it relates to a method and apparatus for reducing the water content of natural gas to within acceptable levels of moisture for passing the gas through a pipe line. It also relates to the reduction of the water content of air to acceptable levels for use in areas where moisture level must be kept under control.

Various systems for reducing the water content of natural gas are presently used. The most common method consists of injecting glycol into a continuous flow of gas and continually recirculating the glycol to adsorb moisture from the gas. The glycol must then be regenerated. This method is relatively expensive and requires a system of multiple pumps. Furthermore the apparatus required for this system is frequently subject to corrosion.

The reduction of water content by adsorption employing a bed of molecular sieve material or other desiccant is also known. Systems have been devised in the past whereby water can be removed from natural gas in a continuous process by using a pair of molecular sieves or other desiccant beds. By periodically alternating the absorption from one bed to the other, the alternate bed can be regenerated.

The present invention provides an improved system employing molecular sieves or other desiccants for removing water from a continuous stream of gas. By utilizing a system which provides a downflow direction of hot gas for regenerating the moisture laden bed, a more efficient and reliable system than those of the prior art is obtained. Furthermore, no gas is wasted and increased efficiency of operation is obtained because of the simplicity of equipment. In a preferred embodiment in which gas is directed downflow through both beds, even greater reliability and simplicity of operation is achieved.

It is therefore an object of this invention to provide an improved method for reducing the water content of a gas by simultaneous downstream adsorption and regeneration in a double bed system employing a suitable solid desiccant material.

Solid desiccant material which was found to be useful includes zeolite type molecular sieve material having a pore size of from 3.0 angstroms to about 10 angstroms.

The molecular sieve beds consist of zeolite material which adsorb water in preference to a hydrocarbon gas. Many such materials are known in the art, such as the natural zeolites mordenite, chabazite, erionite and clinoptiolite. Preferred synthetic zeolite type molecular sieve materials which may be used includes those known as zeolite type A, D, S, R, X and T as described in U.S. 3,024,867 of R. M. Milton. It must be understood that the above natural and synthetic materials must have a pore size from 3.0 angstroms to 10 angstroms.

The method and apparatus of this invention are illustrated in the accompanying drawings, in which FIG. 1 is a diagrammatic representation of one embodiment of the present invention;

Figure 1:
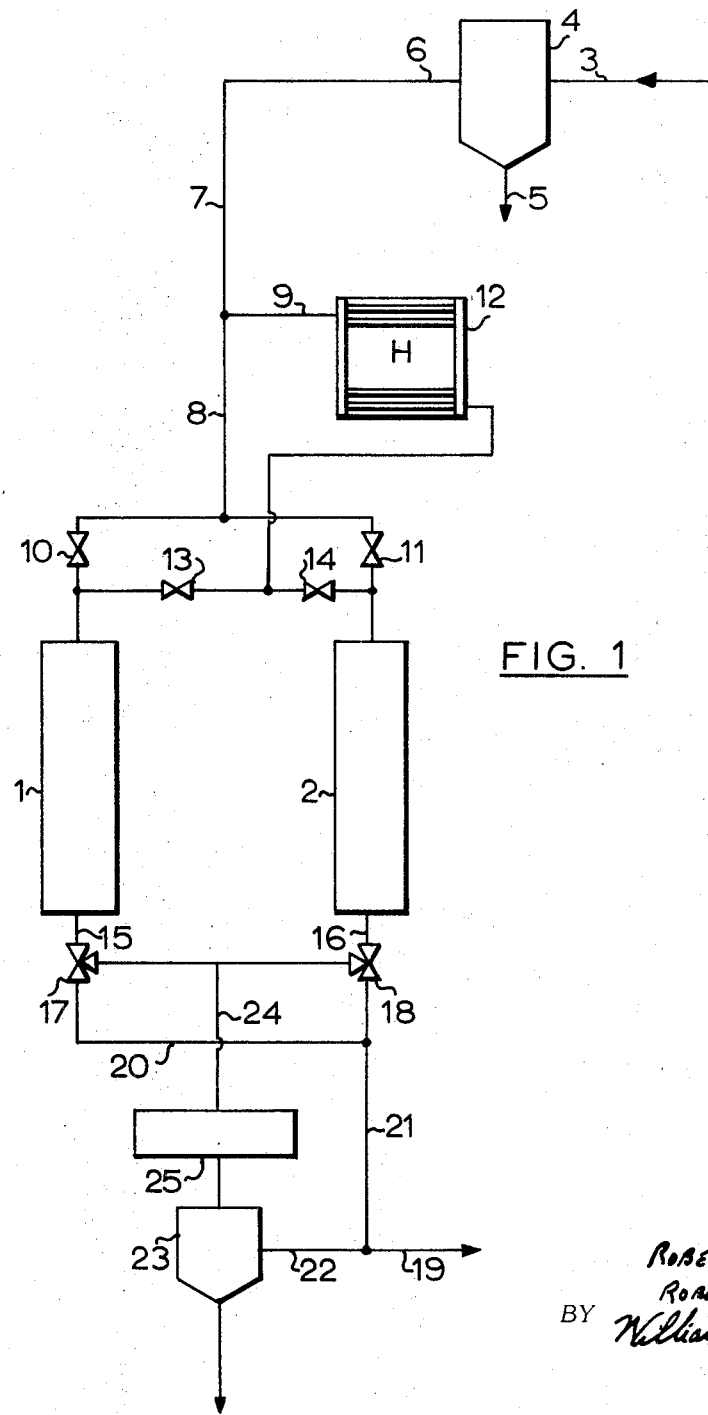

In FIG. 1 a first molecular sieve bed 1 and a second molecular sieve bed 2 are shown connected in parallel. A gas conduit 3 connected at its inlet end to a source of moisture laden gas such as a natural gas wellhead (not shown) is connected to a free water separator 4 having a free water outlet 5 and gas outlet 6. Gas outlet 6 is in communication with gas inlet line 7 which is divided downstream of the free water separator into primary inlet conduit 8 and secondary inlet conduit 9. The primary inlet conduit is branched at its discharge end to functionally communicate with primary inlet gas discharge valves 10 and 11.

A heater 12 is connected in series in secondary inlet conduit 9. The discharge end of the secondary inlet conduit is branched to functionally communicate with secondary inlet discharge valves 13 and 14.

Bed discharge conduits 15 and 16 are directed to three-way valves 17 and 18 respectively which place the bed discharge conduits in functional communication with gas product discharge line 19 via bed discharge lines 20 and 21 respectively or alternatively through line 22 via line 24, cooler 25 and free water separator 23.

A moisture laden gas such as wellhead natural gas having a water content exceeding pipeline specification up to and including 100 percent saturation is delivered via conduit 3 into free water separator 4 wherein free water in the gas is separated and discharged via free water outlet 5. The gas is then directed through outlet 6 and inlet line 7 where it is subsequently divided and directed through primary inlet conduit 8 and secondary inlet conduit 9.

A control valve (not shown) is connected in line 9 so that approximately 1–10 percent of the gas from line 7 is allowed through secondary conduit 9.

For preferred operations from 2 to 5 percent of the total gas is directed to the secondary conduit.

In the first step of gas drying process, the gas in primary inlet conduit 8 is directed downwardly into molecular sieve bed 1 via open discharge valve 10, discharge valves 11 and 13 being closed.

Molecular sieve bed 1 consists of effectively anhydrous molecular sieve material of a type described above such as synthetic zeolite X. By effectively anhydrous molecular sieve material is meant that in which water load is reduced to less than 8 lbs. of water per 100 lbs. of molecular sieve.

The gas from primary inlet conduit 8 is delivered downwardly through sieve bed 1 at a pressure approximately equal to the wellhead pressure or alternatively at a pressure between the wellhead and delivery pipeline pressure. This would be in the range of about 100 to 2500 p.s.i.g. The gas passing through bed 1 is substantially dehydrated and discharged through conduit 15. The moisture removed from the gas is taken up by the molecular sieve material in bed 1.

Simultaneously a minor portion of the gas from line 7, normally constituting from 2 to 5 percent of the total gas in line 7 is directed through secondary conduit 9 where it is heated to approximately a temperature of from 500° to 700° F. A preferred temperature would be approximately 600° F. A temperature below 500° F. would reduce the effectiveness of the gas to purge the wet molecular sieve in the manner to be described. A temperature about 700° F. might be damaging to the molecular sieves.

The heated gas, which contained moisture at the gas inlet line temperature even to the point of saturation, becomes capable at this elevated temperature of absorbing additional moisture. The heated gas is passed downwardly through molecular sieve bed 2 via open valve 14. Valves 11 and 13 remain closed as indicated above.

Molecular sieve bed 2 contains moisture which was adsorbed from wet gas previously passed through bed 2 at relatively cool temperatures. At the elevated temperatures of the gas from conduit 9 this moisture is taken up since the water capacity of the gas is increased leaving bed 2 in a relatively dry state. The substantially water saturated gas is discharged downwardly through conduit 16 and to line 24 via three-way valve 18. This gas is cooled in line 24 and cooler 25 causing moisture to condense and delivered to free water separator 23 where the free water is removed. The moisture laden gas at a temperature substantially lower than the temperature of the regeneration gas is discharge dthrough line 22 and combined with the dry gas in product line 19.

The addition of this relatively small volume of moisture laden gas to the dry gas from line 21 yields a total gas having a water concentration within acceptable limits for pipeline delivery. It would result in a product having less than 4 lbs. of water per million std. cu. ft. and consequently hydrate formation or freezing would not plug up a pipeline under cold weather conditions.

The above process and apparatus is suitable for use on a continuous basis over prolonged periods. The molecular sieve beds are switched on a predetermined time cycle such that the heating bed is regenerated to less than an average of 8 pounds of water per 100 pounds of molecular sieve and the adsorbing bed has not yet passed product gas which when mixed with the cooled regeneration gas exceeds 4 lbs. of water per million std. cu. ft. The completeness of regeneration within the predetermined time cycle is controlled by varying the temperature and/or proportion of heating gas. In the event that the adsorbing bed reaches water break through before the regeneration of the opposite bed is complete, as specified, one can increase the purge gas proportion and/or temperature above the preferred range given.

It must be appreciated that bed 2 is still at a relatively high temperature due to the hot purge gas from the previous step. The relatively cold gas from conduit 8 rapidly cools the bed down to a temperature at which the bed is capable of absorbing moisture. The first small portion of the gas will contact a hot bed and consequently little of its moisture will be adsorbed. The present apparatus is so constructed however that this small portion of moisture laden gas can be carried through discharge conduit 16 and subsequently mixed into product in line 19 without increasing the moisture level of the total product beyond tolerable limits. It must be understood that during the short period before an effective portion of hot sieve bed is cooled down to efficient adsorption temperature of about 150° F. or less moisture laden gas is discharged into the product line. The adsorption capacity is quickly increased due to continual cooling by incoming descending gas.

The relatively dry gas from conduit 16 is passed into line 21 via three-way valve 18 where it is joined with the moisture laden purge gas from line 22.

At the same time the heated gas portion from secondary inlet conduit 9 is passed downwardly through molecular sieve bed 1 via open valve 13. Valves 10 and 14 remaining closed. Bed 1 is purged of an effective amount of the moisture absorbed in stage one. The hot moisture laden gas is discharged downwardly through conduit 15 and then via three-way valve 17 to line 24 where it is cooled in cooler 25 to a temperature below 130° F. and delivered to free water separator 23. The free water is removed from the cooled gas and this cooled moisture laden gas is discharged through line 22 and combined with the dry gas in product line 19.

When bed 2 adsorbs moisture to the extent of its efficiency the drying proceedure can be continued by reversing valves 10, 11, 13 and 14 on a predetermined time cycle as described above.

It can be noted that in the apparatus described above the flows through the molecular sieve beds during both the adsorption and regeneration steps are preferably carried out by passing the gas downwardly through the beds. In order to achieve the advantages of this invention however it is essential that the gas flow in the regeneration step be directed downwardly.

By passing relatively hot gas upwardly through a wet molecular sieve bed damage can be done to the molecular sieve materal by reboiling. By reboiling is meant the action whereby hot gas advancing upwards through a wet bed will desorb water from the bed which travels upwards to a cooler region of the bed where it condenses. It then drops back into the lower hot portion of the bed and its instantaneous revaporization can cause damage to the bed. The avoidance of reboiling permits the bed to be regenerated at a high temperature thus ensuring more complete regeneration.

The present apparatus is also designed to give quick and efficient cooling of the hot regenerated sieve at the start of the adsorption stage. In prior apparatus which used either an upwards or downwards flow of gas for heating a wet sieve bed, the cooling of the sieve was carried out as an intermediate between the hot purge regeneration step and subsequent adsorption. Cooling was slow since it necessitated a small portion of gas as the cooling step and a more expensive system was required to discard this cooling gas or recirculate it into the inlet feed line.

The present apparatus does not require a separate cooling step apart from the subsequent adsorption step on a regenerated bed. Since the present apparatus permits a large volume of wet gas from primary inlet conduit 8 to impinge downwardly onto the heated sieve bed immediately after the heating step, the cooling of the sieve bed is carried out at such a rapid rate that any loss of efficiency would be insignificant for the purpose disclosed herein.

A further advantage in the elimination of a separate cooling step is that heater 12 can be set to deliver a constant temperature without interruption since moisture laden gas is continually passed through secondary conduit 9 and then to either sieve bed 1 or 2 as required.

An additional advantage is that the heater may be smaller since heating is only required to heat the relatively small portion of gas in the regeneration step. A particularly efficient system can be maintained in the preferred embodiment of this invention wherein a pair of free water separators are utilized at the discharge end of the dual-bed in order to reduce the number of valves required in the system. These and other preferred embodiments can be seen with particular reference to FIG. 2.

Figure 2:
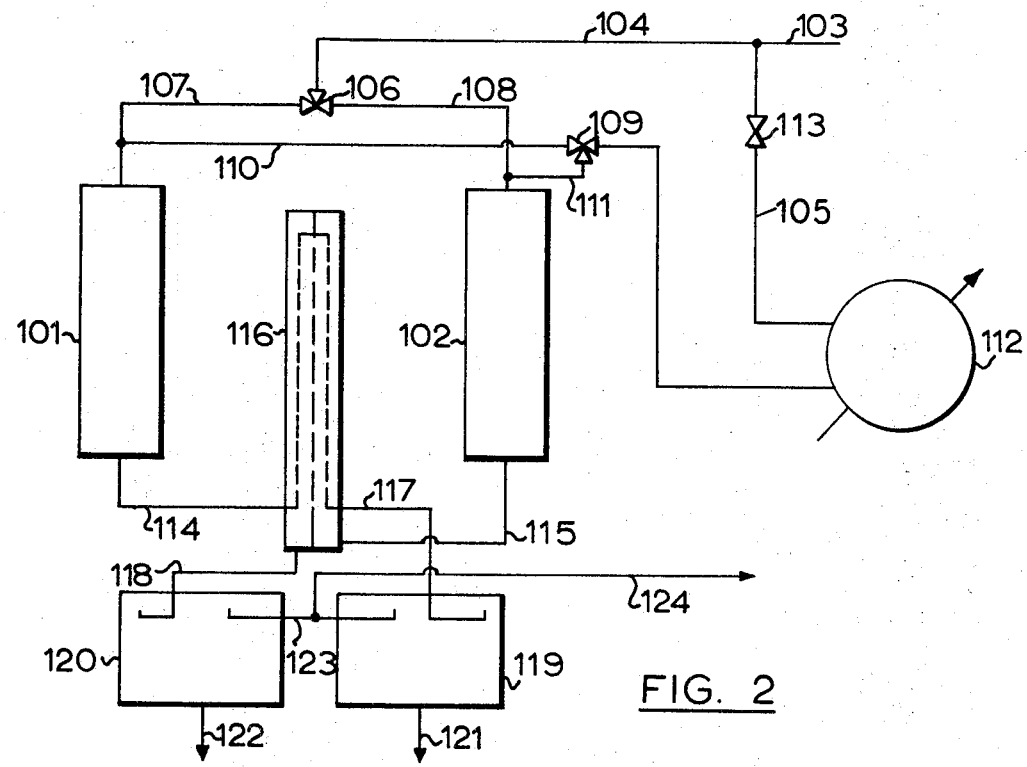
FIG. 2 is a diagrammatic representation of another preferred embodiment of the present invention.

In FIG. 2 a first molecular sieve bed 101 and a second molecular sieve bed 102 are shown connected in parallel. A gas conduit 103 connected at its inlet end to a source of moisture laden gas such as a natural gas wellhead (not shown) is divided into a primary inlet conduit 104 and a secondary inlet conduit 105. It will be appreciated that a free water separator can be connected in conduit 103 in the manner described of FIG. 1. The primary inlet conduit 104 is connected at its outlet end to a three-way valve 106 whereby it may be operably connected to bed inlet 107 or 108. Secondary inlet conduit 105 is connected at its outlet end to three-way valve 109 whereby it may be operably connected to sieve inlet lines 107 or 108 through lines 110 and 111 respectively. A heater 112 is connected in series in secondary conduit 105. A flow regulator 113 is also connected in conduit 105 so that the proportion of gas directed through secondary conduit 105 may be regulated within the desired percentage range of the total gas as indicated above.

Bed discharge conduits 114 and 115 are directed in heat exchange relationship through heat exchanger 116 and are connected at their outlet ends to knock-out pot inlets 117 and 118 respectively. Inlets 117 and 118 on water knock-out pots 119 and 120 respectively have water discharge outlets 121 and 122 and a common gas outlet 123 leading into product discharge outlet 124.

In the first stage of the process wet gas from primary inlet 104 is directed through three-way valve 106 into sieve bed inlet line 107 where it is directed downwardly through dry molecular sieve bed 101. The water in the gas is adsorbed by the sieve bed and relatively dry gas is discharged through bed discharge conduit 114 and then to pot inlet 117 after passing through heat exchanger 116. The temperature of the dried gas is raised slightly in the heat exchanger in a manner to be described below. Since no free water is present in this gas water knock-out pot 119 is not required at this stage. The reason for its presence as a preferred arrangement will be better understood when the efficiency of the valving system is discussed below. The dry gas is discharged through common gas outlet 123 and thence through product discharge outlet 124.

Simultaneously gas from secondary inlet conduit 105 is directed through flow regulator 113 and then through heater 112 where it is heated to a temperature of from 400° F. to 700° F. This relatively small portion of heated wet gas is directed through sieve inlet line 111 via three-way valve 109. The hot gas is directed downwardly through molecular sieve bed 102 which contains moisture absorbed in a previous adsorption step. Moisture in the sieve bed is taken up by the hot gas and the bed is thereby regenerated.

The hot wet gas is passed through bed discharge conduit 115 and then to pot inlet 118 after passing through heat exchange 116.

The purge gas passing into conduit 115 is at a temperature rising to approximately 400° F. to 650° F. By passing this conduit in heat exchange relationship with bed discharge conduit 114 which contains gas at a temperature equal to the exit gas temperature from bed 101, the temperature of the dried gas and the purge gas tends to equalize.

Since the volume of hot purge gas is relatively small compared to the volume of cool dry gas, the purge gas is efficiently cooled without causing a substantial temperature increase in the dry gas.

The small portion of cooled wet purge gas is delivered into knock-out pot 120 via inlet 118. Free water is discharged through outlet 122 and the gas is discharged through common outlet 123 and combined with the dry gas in product outlet 124 to give a product having a moisture concentration within acceptable limits for pipeline delivery.

In the next cycle of the process, gas from primary inlet conduit 104 is immediately directed through three-way valve 106 into bed inlet line 108 where it is directed downwardly through dried molecular sieve bed 102. As explained in the previous embodiment, relatively cool gas from line 108 is discharged immediately into the sieve which is still hot from the previous purge step. The bed is quickly cooled as explained above and no separate cooling step is required prior to adsorption. Water is adsorbed on the sieve bed and dried gas is discharged downwardly through discharge conduit 115. The dried gas in pot inlet 118 is passed via water knock-out pot 120 to common gas outlet 123 and then to outlet 124.

Simultaneously, gas from secondary inlet conduit 105 is heated and directed through sieve inlet line 110 via three-way valve 109. The hot gas is directed downwardly through molecular sieve bed 101 which contains moisture from the adsorption step of the previous cycle. Moisture is taken up by the hot gas and sieve bed 101 is thereby regenerated.

The hot wet gas is passed through discharge conduit 114 and then to pot inlet 117 after being cooled through heat exchanger 116. The free water is removed from the gas via water discharge outlet 121 of knockout pot 119 and the gas is combined with the dried gas via common gas outlet 123 and subsequently delivered to a pipe line.

The above embodiments utilizes two knock-out pots or free water separators downstream of the molecular sieve beds. While one could employ only a single pot with suitable valving to swing it into communication with the particular bed being regenerated, the use of separate pots linked by a common gas outlet eliminates the need of a valving system downstream of the sieve beds.

The apparatus disclosed above allows for simplicity of valving. In the second embodiment for example, the apparatus can be operated continuously for prolonged periods by activating a single switching mechanism which operates three-way valves 106 and 109 simultaneously after each completed adsorption-regeneration cycle. When valve 106 is opened to bed inlet line 107, valve 109 is opened to bed inlet line 108 via line 111. When this cycle is completed, valve 106 is opened to line 108 and valve 109 is simultaneously opened to line 107 via line 110. This not only simplifies the switch over of the beds from adsorption and regeneration but such a single switching mechanism reduces the possibility of pressure bumping in the gas lines.

It can be readily understood that in the positioning of such an apparatus at a natural gas wellhead it is desirable to have an automatic activating mechanism for switching the beds on alternate adsorption and regeneration. Whether such automatic device is activated by the moisture content or temperature of the bed or gas stream or by a simple timing device to a single "switch-over" operation for purposes of simplicity and efficiency of operation.

Figure 3:
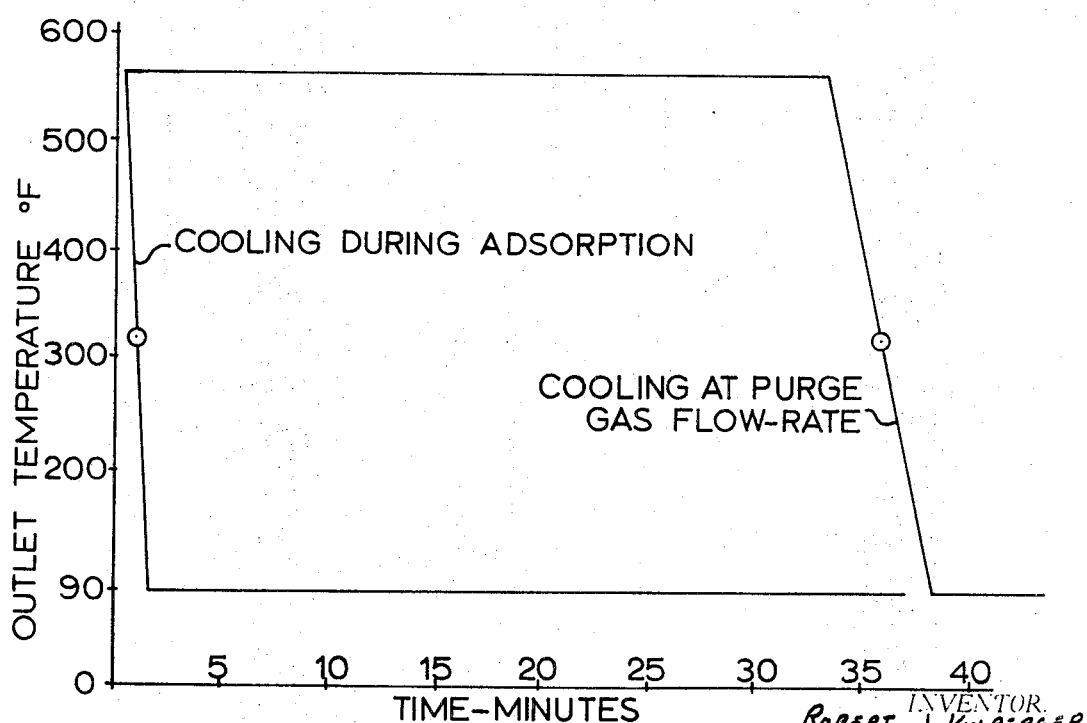
FIG. 3 is a graph showing the cooling rate of the discharge gas from the regenerated bed in one embodiment of this invention as compared to a prior art system.

The graph in FIG. 3 illuustrates a particular advantage of the present invention with respect to the cooling of the regenreated bed. As indicated above, the bed which has been regenerated by hot purge gas from the secondary conduit is immediately subjected to a large volume of relatively cool wet gas from the primary conduit. While the bed adsorbs little or no water from the cool wet gas at its initial high temperature, the large volume of such gas cools the bed rapidly and the bed becomes capable of adsorbing moisture within seconds and reaches its full adsorbent characteristics within a few minutes.

As indicated above, the primary stream containing water which is not adsorbed in this short period constitutes a small percentage of the total gas passing through the system on a continuous basis. This portion of moisture laden gas together with the dry gas from the cooled bed when combined with the small portion of purge gas from the secondary stream after cool down and water knock-out yields a gas having a total average moisture content within tolerable limits for passing through a pipeline without danger of freeze-up or hydrate formation in the line.

The graph shows an example of the time required in the present invention to cool a bed of molecular sieve material from the exemplary regeneration temperature of 550° F. to the exemplary adsorption temperature of 90° F. compared with the time required to cool a similar bed by means of a cooling step employing the same gas flow as in the purging step. In both cases the temperatures indicated are those of the gas discharging at the bed exit. It will be appreciated that the time given to achieve complete cooling of the bed is taken at the time required for the gas at the bed exit to reach the same temperature as the temperature of the gas entering the bed.

In the example illustrating this invention a typical stream of gas from the primary conduit at a flow rate of 420,000 std. cu. ft./hr. and a temperature of 90° F. is passed through a bed of 750 lbs. of type X molecular sieve which is initially at 550° F. It can be seen that the time required to completely cool the bed to 90° F. is approximately 1.5 minutes.

In the example wherein only a small portion of gas such as the purge flow is used in a separate cooling step, gas at a temperature of 90° F. is passed through a similar bed of molecular sieve material at a flow rate of approximately 13,750 std. cu. ft./hr. It can be seen that the time required to cool the bed from the exemplary temperature of 550° F. to 90° F. is approximately 38 minutes.

While it must be recognized that complete cooling of the bed is not required in order to provide adsorption, a comparison of the time required to reach a temperature of 320° F. for example can be seen from the points indicated on each of the slopes of the graph. In the slope illustrating the cooling in the present invention and indicated as "Cooling during Adsorption" this temperature is reached in approximately 0.6 minute. The slope which is indicated as "Cooling at Purge Gas Flow Rate" shows that this temperature is reached in about 35.5 minutes.

We claim:
1. A process for reducing substantially the water content of a moisture laden gas which comprises the sequential steps of:
(a) dividing a moisture laden gas into a primary stream and a secondary stream, said secondary stream constituting from 1 percent to 10 percent by volume of the gas;
(b) passing the primary stream through a first bed of substantially anhydrous solid desiccant material to substantially dehydrate the primary stream, and simultaneously passing the secondary stream through a heating means to heat the secondary stream and then downwardly through a second bed of said desiccant material which is laden with water to effectively purge the second bed of said water;
(c) cooling the moisture laden secondary stream and remove the free water content therefrom;
(d) combining the secondary stream with the dehydrated primary stream;
(e) immediately after purging with said heated secondary stream passing a further primary stream of gas through the second bed to effectively cool the second bed;
(f) continuing the passage of said primary stream through the second bed to substantially dehydrate the primary stream, and simultaneously passing the secondary stream through a heating means to heat the secondary stream and then downwardly through the first bed, said first bed being laden with water, to effectively purge the first bed of said water;
(g) repeating steps (c) and (d).

2. A process for reducing substantially the water content of a moisture laden gas which comprises the steps of:
(a) dividing a moisture laden gas into a primary stream and a secondary stream, said secondary stream constituting from 2 percent to 5 percent by volume of the gas;
(b) passing the primary stream downwardly through a first bed of substantially anhydrous zeolite type molecular sieve material having a pore size of from 3.0 angstroms to 10 angstroms to substantially dehydrate the primary stream, and simultaneously passing the secondary stream through a heating means to heat the secondary stream and then downwardly through a water-laden second bed of said zeolite type molecular sieve material which is laden with water, to effectively purge the second bed of said water;
(c) cooling the moisture laden secondary stream to remove the free water content therefrom;
(d) combining the secondary stream with the dehydrated primary stream;
(e) immediately after purging with said heated secondary stream passing a primary stream of gas through the second bed to effectively cool the second bed;
(f) continuing the passage of said primary stream through the second bed to substantially dehydrate the first stream and simultaneously passing the secondary stream through a heating means to heat the secondary stream to a temperature from 400° F. to about 700° F. and then downwardly through the first bed, said first bed being laden with water, to effectively purge the first bed of said water;
(g) repeating steps (c) and (d).

3. A process as claimed in claim 2 wherein the said gas is a wellhead natural gas and wherein the water content of the total gas is reduced from a water content which exceeds pipeline specification even to 100 percent saturation to a concentration of not more than 4 lbs. of water per million std. cu. ft.

4. A process as claimed in claim 3 wherein the said zeolite type molecular sieve material is one selected from the group consisting of zeolite A, D, S, R, X, and T.

References Cited

UNITED STATES PATENTS

| | | | |
|---|---|---|---|
| 3,078,635 | 2/1963 | Milton | 55—75 X |
| 3,164,453 | 1/1965 | Milton | 55—75 X |
| 3,241,294 | 3/1966 | Walker et al. | 55—33 X |
| 3,245,205 | 4/1966 | McCarthy et al. | 55—180 X |
| 3,435,591 | 4/1969 | Spencer et al. | 55—62 |

REUBEN FRIEDMAN, Primary Examiner